United States Patent [19]

Henninger et al.

[11] Patent Number: 5,499,371
[45] Date of Patent: Mar. 12, 1996

[54] METHOD AND APPARATUS FOR AUTOMATIC GENERATION OF OBJECT ORIENTED CODE FOR MAPPING RELATIONAL DATA TO OBJECTS

[75] Inventors: Derek P. Henninger, Cupertino; Richard H. Jensen, Redwood City; Christopher T. Keene, San Francisco, all of Calif.

[73] Assignee: Persistence Software, Inc., San Mateo, Calif.

[21] Appl. No.: 409,476

[22] Filed: Mar. 22, 1995

Related U.S. Application Data

[63] Continuation of Ser. No. 95,322, Jul. 21, 1993, abandoned.
[51] Int. Cl.[6] .............................. G06F 9/44; G06F 15/40
[52] U.S. Cl. .................... 395/700; 395/600; 364/280; 364/280.4; 364/282.1; 364/283.4; 364/DIG. 1
[58] Field of Search .................................... 395/600, 650, 395/700, 500

[56] References Cited

U.S. PATENT DOCUMENTS

| | | | |
|---|---|---|---|
| 4,930,071 | 5/1990 | Tou et al. | 364/300 |
| 5,235,701 | 8/1993 | Ohler et al. | |
| 5,291,583 | 3/1994 | Bapat | 395/500 |
| 5,295,256 | 3/1994 | Bapat | 395/500 |
| 5,297,279 | 3/1994 | Bannon et al. | 395/600 |
| 5,426,780 | 6/1995 | Gerull et al. | 395/600 |

OTHER PUBLICATIONS db++User's Manual (Feb. 17, 1992) from Rogue Wave.

*Primary Examiner*—Kevin A. Kriess
*Attorney, Agent, or Firm*—Townsend and Townsend and Crew; Kenneth R. Allen

[57] ABSTRACT

A method and apparatus are provided for using an object model of an object-oriented application to automatically map information between an object-oriented application and a structured database, such as a relational database. This is done by taking into account all of the semantics (implications) of an object model, such as inheritance and relationships among object classes, and using these semantics to generate a minimal set of routines for each object class that manipulate the object and other objects to which it is related or from which it inherits. The generated routines, when executed, provide transparent access to relational data or other field-delimited data. Object classes and routines generated using the method encapsulate all the details of database access, such that developers (computer programmers) can write object-oriented applications using those object classes without any explicit reference to or knowledge of the underlying database or its structure. By working with the objects, the user of such applications transparently manipulates the database without needing to know anything of its structure. Applications can be written using the object classes to transparently integrate information from multiple databases.

30 Claims, 11 Drawing Sheets

METHOD AND APPARATUS FOR AUTOMATIC GENERATION OF OBJECT ORIENTED CODE FOR MAPPING RELATIONAL DATA TO OBJECTS

This is a continuation of application Ser. No. 08/095,322 filed Jul. 21, 1993, now abandoned.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

MICROFICHE APPENDICES

Two appendices comprising a total of 1444 frames on 16 microfiche are included as part of this application. Appendix I contains the source code of Persistence™ version 1.3 released Jun. 15, 1993. It comprises 1358 frames on 14 microfiche. The Persistence™ software represents an embodiment of the method of the present invention. Appendix II contains a user's manual for Persistence™ version 1.2 released March 1993. It comprises 100 frames on 2 microfiche.

The source code in Appendix I represents unpublished work, Copyright© 1993 Persistence Software, Inc. All rights reserved. The user's manual in Appendix II is Copyright© 1993 Persistence Software, Inc. All rights reserved. For both Appendices I and II, copyright protection claimed includes all forms and matters of copyrightable material and information now allowed by statutory or judicial law or hereafter granted, including without limitation, material generated from the software programs which are displayed on the screen such as icons, screen display looks, etc.

BACKGROUND OF THE INVENTION

The invention relates to the interrelationship of databases, particularly relational databases, and object-oriented systems. More particularly, the invention relates to relationships between objects in object-oriented systems and descriptions of objects storable in field-delimited database structures. Field-delimited databases can structure data into fields which have common attributes. For example, relational databases can structure data into tables, each with columns and rows (in "n" dimensions) forming tuples, upon which certain operations in set algebra can be performed very conveniently.

Object-oriented applications organize data and routines together into encapsulated units referred to as objects. Object-oriented applications lead to modular software systems which have increased flexibility and are easy to alter and maintain.

An object model is a formal description of an object-oriented application. The semantic elements of an object model describe object classes, attributes of object classes, relationships between object classes, and inheritance between object classes. An object model provides a powerful mechanism to represent the real world, for example because objects carry information about inherited characteristics and relationships with other objects. For example, an object model of a car can contain many classes, such as "tire." The tire class can have attributes, such as "pressure"; relationships, such as "tire" is related to an "axle"; and inheritances, such as a "snow tire" inherits from a "tire."

The difference between a relational database management system (RDBMS) and an object-oriented application is that an object "knows" what operations can be performed on its data, whereas an RDBMS only has a set of generic operations which can be performed on its tuples. The semantics available in an object model are not preserved in a relational database. For example, a "snow tire" knows that it is related to an "axle" and inherits from a "tire." In contrast, a relational database represents this information in three separate data tables with no explicit representation of the relationships between the tables. The tire table in a relational database might have foreign key information referring to the axle table, but this representation of the relationship between tire and axle is implicit. It is up to the developer to know about these relationships, what they mean, and how to handle them.

There is a desire to build object-oriented applications that store and access data found in relational databases. For example, it would be useful to employ a plan for an automobile (an object model) to build a vehicle (an object) from an organized inventory of auto parts (a relational database). A system is needed which can map information between a database and an object-oriented application based on the semantics of an object model. More particularly, what is needed is a mechanism for using the semantic elements of an object model to generate routines that map data between a database and an object-oriented application.

Systems are known for manual mapping between objects in knowledge bases and database management systems. One approach is to employ a static class library as an interface between an object-oriented system and a relational database. An example is METHOD FOR INTEGRATING A KNOWLEDGE-BASED SYSTEM WITH AN ARBITRARY RELATIONAL DATABASE SYSTEM, U.S. Pat. No. 4,930,071 issued May 29, 1990 and assigned to IntelliCorp, Inc. of Mountain View, Calif. In static-type systems, objects can be extended to handle concepts such as relationships and inheritance, but they must be manually extended if they are to model complex real world structures. This limits their usefulness to building relatively simple object models from existing data, such as those used in rapidly building prototype systems. It is believed that there are commercial systems which use the static-type class approach. Among the candidates include "ProKappa" from IntelliCorp, "DB.H++" from Rogue Wave of Corvallis, Oreg., and possibly "Open ODB" from Hewlett Packard Company of Cupertino, Calif. and "UniSQL from UniSQL of Austin, Tex.

SUMMARY OF THE INVENTION

According to the invention, a method and apparatus are provided for using an object model of an object-oriented application to automatically map information between an object-oriented application and a structured database, such as a relational database. This is done by taking into account all of the semantics (implications) of an object model, such as inheritance and relationships among object classes, and using these semantics to generate a minimal set of routines for each object class that manipulate the object and other objects to which it is related or from which it inherits. The generated routines, when executed (that is, when converted to an executable form which is then executed), provide transparent access to relational data or other field-delimited data. Object classes and routines generated using the method encapsulate all the details of database access, such that developers (computer programmers) can write object-oriented applications using those object classes without any explicit reference to or knowledge of the underlying database or its structure. By working with the objects, the user of such applications transparently manipulates the database without needing to know anything of its structure. Applications can be written using the object classes to transparently integrate information from multiple databases.

The method of the invention comprises accepting a user-defined object model as a "blueprint" for an object-oriented application; accepting or constructing a schema of the structure of data in a database; and accepting or constructing a transform defining the mapping between the database schema and the object model. Based on these inputs the method automatically generates source code routines for each object class to perform four tasks: to create, retrieve, update, and delete instances of the object class and automatically make the corresponding changes in the database. These source code routines can subsequently be executed.

The invention will be better understood by reference to the following detailed description in connection with the accompanying drawings.

DESCRIPTION OF A SPECIFIC EMBODIMENT

Figure 1:
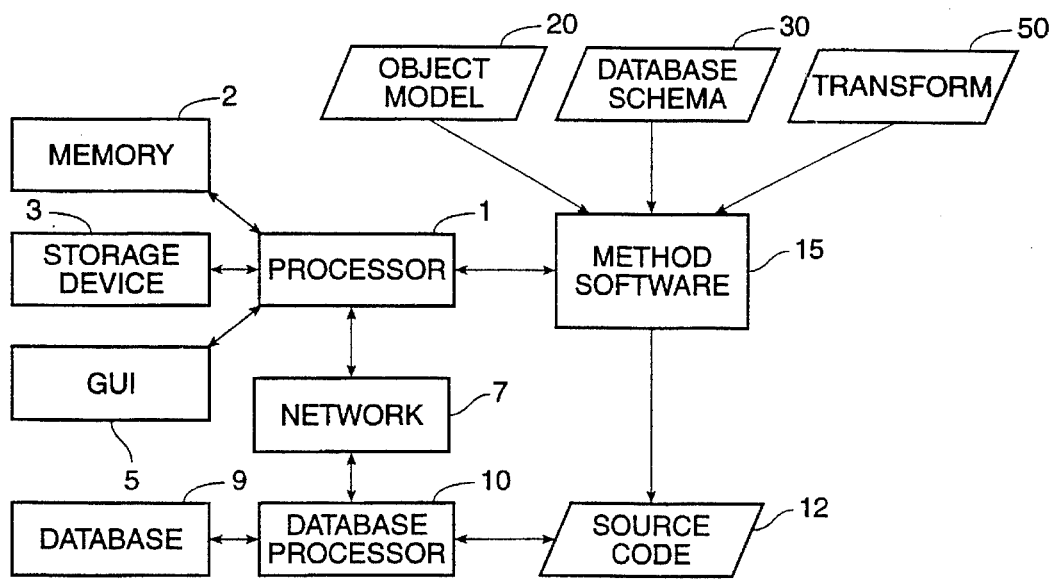
FIG. 1 is a block diagram of a computer system in accordance with the invention.

Following is a description of a specific embodiment of the method of the present invention. Section 1 sets forth terminology that is used in the remainder of the description. Section 2 provides a description of a computing system that can be used to support the steps of the method. Section 3 describes the inputs to the method. Section 4 describes an overview of the method steps. Sections 5 and 6 give more detailed descriptions of specific method steps. Section 7 concludes the description.

1. Terminology

It is helpful to clarify the general meanings of terms used in connection with object-oriented systems.

An "object class" is a set of data (attributes) and functional capabilities (routines) encapsulated into a single logical entity. For example, an employee class may be characterized by a telephone number attribute and a "hire$_{13}$employee" routine.

An "object instance" is an embodiment (instantiation) of an object class. Instances are differentiated from one another by their attribute values, but not their routines (capabilities). For example, Jane Smith may be a first person-object instance and John Doe may be a second person-object instance. The term "object" is often used by itself to refer loosely to either an object class or an object instance, the difference being understood in context.

An "object-oriented application" is an operational computer program which when employed on an appropriate computer system uses a set of object instances that work in cooperation to perform useful work. For example, an object-oriented application could be built to manage personnel records for a company, including such operations as hire new employee or add an employee to a department.

An "object model" is a set of object classes that together form a blueprint for building an object-oriented application. Each object class of an object model can have attributes, inheritances, and relationships.

A "relationship" defines a link between two object classes. For example, an employee class may be related to the department class Each specific employee for example, "Jane Smith," would have a relationship with a specific department, such as "engineering." Relationships can be one-to-one, one-to-many, or many-to-many. An example of a one-to-one relationship can be a relationship between employee and parking place such that each employee can have a single parking place. An example of a one-to-many relationship can be a relationship between department and employee such that each department can employ multiple employees. An example of a many-to-many relationship can be a relationship between employee and project such that each employee serves on multiple projects, and each project consists of multiple employees.

"Attributes" are data elements of object classes which are expressed through particular values in object instances. For example, a person class can have the attribute "name", and a particular person instance can have the name value "Jane Smith."

An "object ID" is used to uniquely identify each object instance. The object ID can generated in one of two ways. It can be generated by the application, which can automatically assign a unique object ID for each new object instance. Alternatively it can comprise a set of attributes that are guaranteed in the object model to always form a unique set of values for an instance. In this case, the create routine will require a unique set of attributes in order to create a new object instance.

A "routine" is a functional capability associated with an object class. For example, the routine "hire$_{13}$ employee" could be used to create a new employee instance.

"Inheritance" represents a specialization of an object class in which the specialized class shares all of the attributes and routines of parent classes. Thus the employee class can inherit certain attributes, such as name, from the person class. In this case, the person class is called the "parent" of the employee class, and the employee class is called the "child" of the person class.

Inheritance can extend across many object class "generations." For example, the object class "snow tire" can inherit from the object class "tire" which in turn can inherit from the object class "car_part". In this example, "car_part" is a parent of the object class "tire" and an ancestor of the object class "snow tire".

Inheritance can be "vertical" (concrete) or "horizontal" (abstract) according to how the information corresponding to inherited attributes is stored in the database. In the case of vertical inheritance between two object classes in an object model, the database contains data associated with each object class. In the case of horizontal inheritance between two object classes in the object model, the database does not contain data associated with each object class. For example, suppose that there are two object classes, "and that "employee" inherits "person" and "employee" inherits from "person." If this inheritance is vertical, then there can be a "person" table in the database which contains the attributes for each "person". If the inheritance is horizontal, there is no "person" table in the database. All the attributes of "person" are found in the "employee_data" table. Horizontal and vertical inheritance can be mixed within the same object model.

The attributes, inheritances, and relationships of all the object classes of an object model are called the "semantics" or "semantic elements" of the object model. An object model contains certain information associated with its semantics. For each attribute, the object model contains information as to whether that attribute is to be associated with the object ID for the class. For each inheritance, the object model contains information as to whether the inheritance is vertical or horizontal (concrete or abstract).

For each relationship, the object model contains information about a "delete action" associated with that relationship. The delete action specifies what happens to object instances of a related class whenever an object instance of the given class is deleted. For example, if an object instance of the object class "department" is deleted, the delete action for the employee-department relationship can specify that the employees of that department are to be deleted as well. For each relationship in the object model, referential integrity must be maintained in the corresponding database tables. Referential integrity requires that the foreign key columns for any particular row always refer to valid primary key columns in the related table.

2. System Overview

FIG. 1 illustrates a digital computing system suitable to implement the method of the present invention in a typical embodiment. The system comprises computing hardware and related system software that together support the execution of method software 15, which is software that carries out the steps of the method of the invention. More particularly, the system of FIG. 1 comprises a processor 1 that is coupled to a memory 2, a storage device 3 (such as a hard disk), and a user interface such as graphical user interface 5. The processor 1 is also coupled to at least one database, in this case to database 9 via network 7. In the illustrated embodiment the database 9 has its own associated hardware including a database processor 10 that is distinct from processor 1. In other embodiments the database 9 is a software entity that is executed by processor 1, and network 7 is not present. It will be appreciated by those of skill in the art that a wide range of computing system configurations can be used to support the method of the present invention including, for example, configurations that employ multiple processors and multiple databases.

Method software 15 makes use of certain components that are also shown in FIG. 1. Among these components are an object model 20, a database schema 30, and transform 50. Object model 20, database schema 30, and transform 50 are accepted or created at run time by the method. In FIG. 1 they are illustrated as inputs to be accepted. Information about the object model 20 can be accepted using the processor 1 in conjunction with graphical user interface 5 or storage device 3 to input the object model. Information about the database schema 30 and transform 50 can be accepted in a like manner; alternatively, database schema 30 and transform 50 can be constructed by the method using processor 1.

The method generates source code 12 representing code for each of the object classes in the object model 20 as output. This code, when converted to an executable form and executed, can create, retrieve, update, and delete object instances. Source code 12 can, for example, be output to storage device 3 or user interface 5, held in memory 2 and made available for further processing, or immediately or subsequently executed by processor 1 or another processor.

3. Method Inputs

Figure 2:
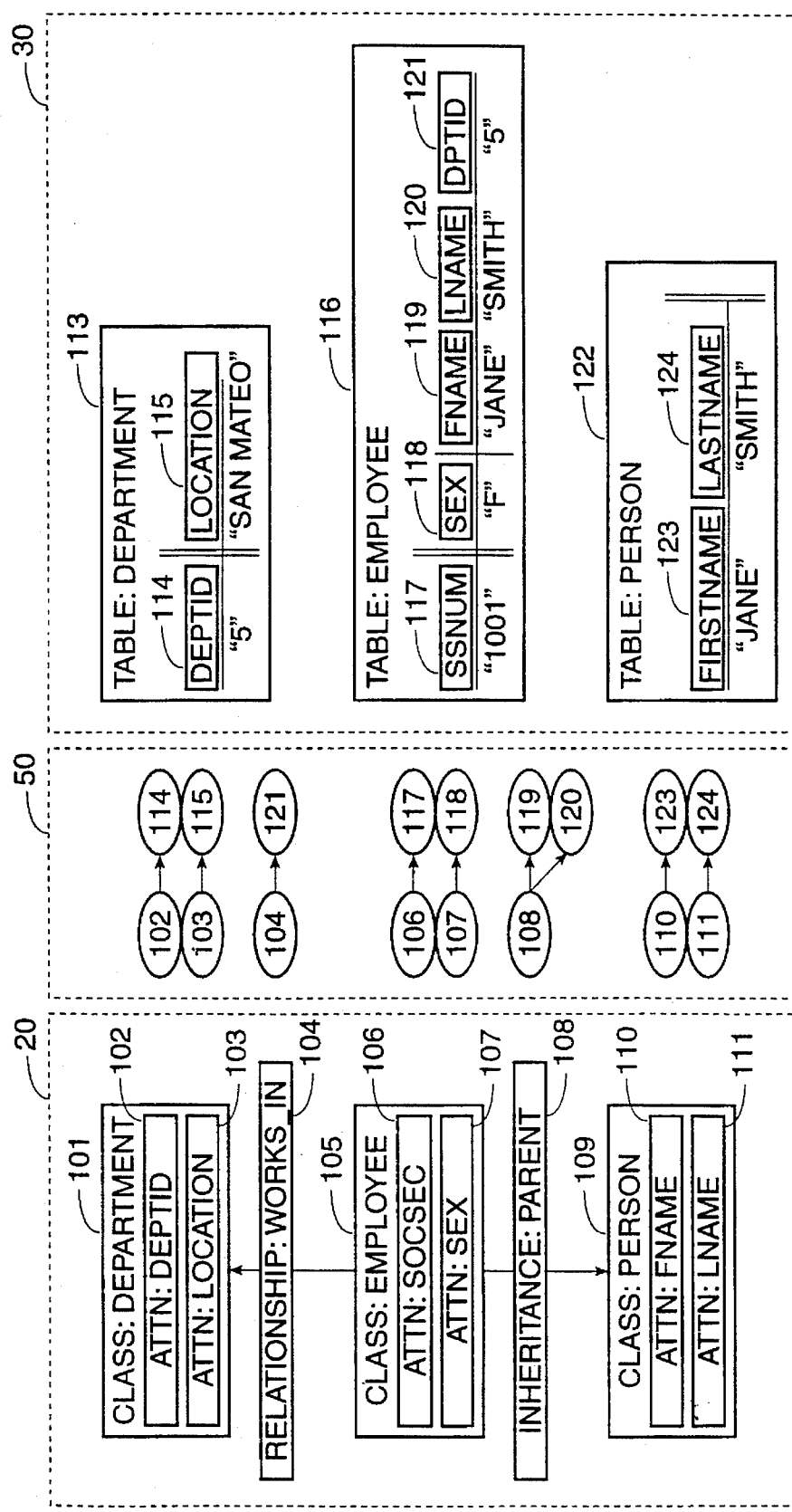
FIG. 2 is a schematic diagram representing the correspondence between a database schema and an object model by means of a transform.

FIG. 2 is a schematic diagram representing the correspondence between the database schema 30 and the object model 20 by means of a transform 50 for an example object-oriented application.

According to the method of the invention, an object model is used to describe the structure of an object-oriented application, including the structure of each object in the application and the relationships and inheritances between objects. In FIG. 2, the object model 20 represents the structure of a personnel records management application. For purposes of this example, the object model 20 has three object classes: department class 101, employee class 105, and person class 109. The object model 20 contains attributes 102, 103 for the department class 101; attributes 106, 107 for the employee class 105; and attributes 110, 111 for the person class 109. The object model 20 also contains one relationship, called works_in (relationship example 104), and one inheritance, in which employee class 105 inherits from person class 109 (inheritance example 108). The works_in relationship expresses the idea that each department has some number of related employees that work in the department. The inheritance between employee class 105 and person class 109 expresses the idea that an employee is a kind of person (that is, employee is a child class of person, and person is a parent class of employee). The object model 20 also contains information (not shown) about what attributes form the object ID for each class, whether the inheritance between employee and person is vertical or horizontal, and what kind of delete action is associated with the relationship between department and employee. In this example, employee class 105 inherits vertically from its parent, person class 109.

The database schema 30 for a field-delimited database can be organized into tables, as in a relational database. As shown in FIG. 2, an exemplary relational database comprises a department table 113, an employee table 116 and a person table 122. Within each table 113, 116, 122 are columns that can be of three types: primary key, foreign key, and data.

A primary key column is employed to uniquely identify each row in a table. Multiple primary key columns can also be used in combination to uniquely identify each row in the table; an example is a combination of a first name column 123 and a last name column 124 as in person table 122. Column 114 of the department table 113, column 117 of the employee table 116, and columns 123 and 124 of person table 122 are primary key columns.

A foreign key column (or columns) can be employed to logically connect a row in a given table to a unique or specific row in another table. For example, column 121 in employee table 116 is a foreign key to column 114 of department table 113, and columns 119 and 120 of employee table 116 are foreign keys to columns 123 and 124 of person table 122.

A data column is employed to store information that is neither a primary key nor a foreign key. For example, location column 115 of department table 113 and sex column 118 of employee table 116 are data columns. Person table 122 has no data columns.

The transform 50 describes a mapping between elements of the object model 20 and elements of the database schema 30. Specifically, the transform 50 describes four kinds of mappings. First, there is the mapping between the attributes that make up an object ID for an object instance and the primary key columns in one or more database tables. For example the transform 50 maps the object ID attribute 102 to primary key column 114. Second, there is a mapping between an object class attribute in a object model and a column or columns in a database. For example, the transform 50 maps attribute 107 to column 118. Third, there is the mapping between a relationship in an object model and a foreign key column or columns in a database table. For example, the transform 50 maps relationship 104 to column 121. Fourth, there is the mapping between inheritance and a foreign key column or columns in a database. For example, the transform 50 maps inheritance 108 to columns 119 and 120.

4. Method Overview

Figure 3:
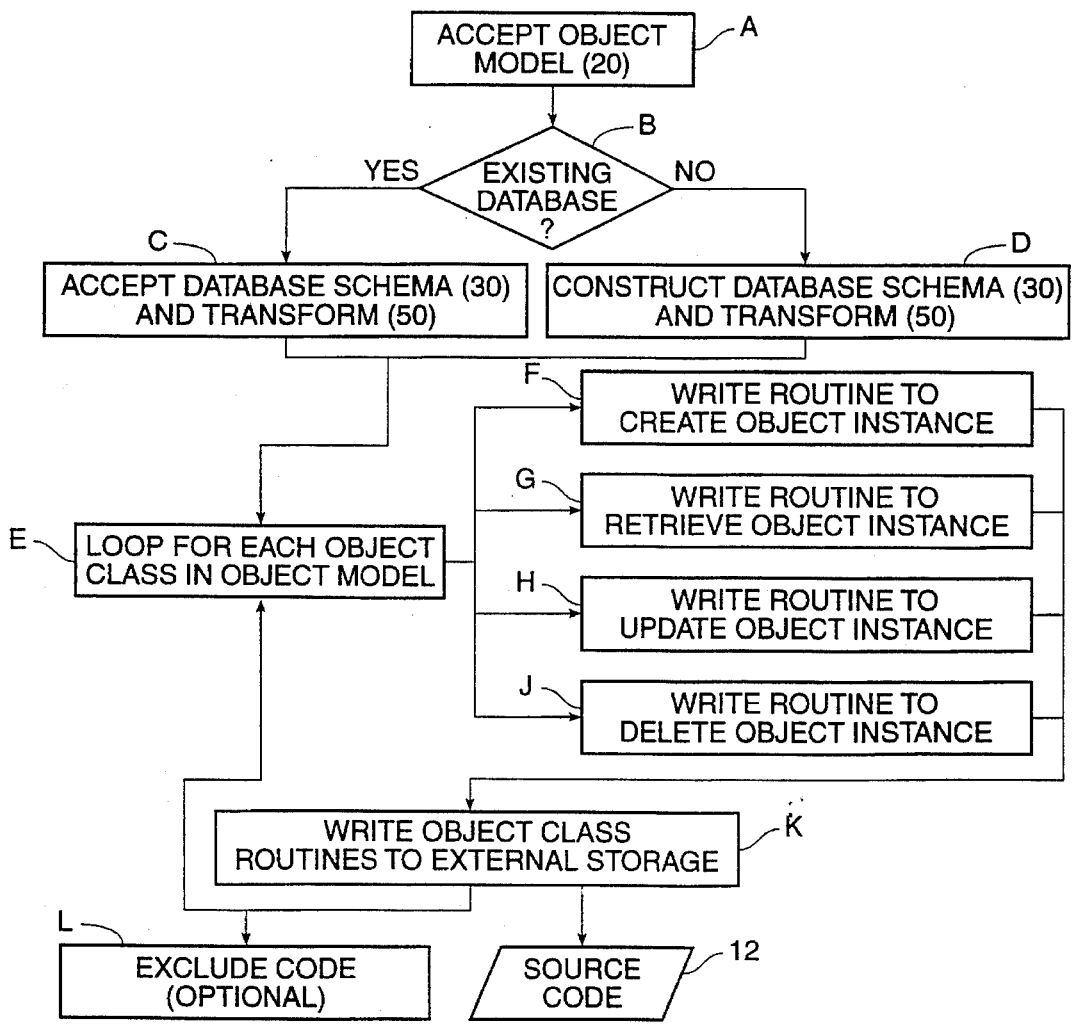
FIG. 3 is a flow chart representing an overview of the method steps.

The flow chart of FIG. 3 provides an overview of the operation of the method of the invention. The method accepts object model 20 and accepts or creates database schema 30 and transform 50. Using these three elements as input, the method automatically generates source code. More particularly, the method generates the object classes in object model 20. Each generated object class contains routines to create, retrieve, update, and delete instances of that object class. Each routine takes into account the full semantics of the object model, including attributes, inheritances, and relationships in the object model. The method outputs the generated code as source code 12, which optionally can be converted to an executable form which can then be executed.

The steps of the method are performed by processor 1 in conjunction with the other system components to which it is coupled. For example, processor 1 can act in conjunction with user interface 5 to accept object model 20, database schema 30, and transform 50. As another example, processor 1 can use storage device 3 to store the output source code 12, or can use network 7 to communicate the source code 12 to another processor also coupled to network 7.

The first step in the method is to accept an object model 20 (Step A). Thereafter, if there is an existing database (Step B), the method accepts a database schema 30 and a transform 50 from an external source (Step C). Otherwise, the method constructs a database schema 30 and a transform 50 derived from the object model 20 (Step D).

Thereafter a loop (step E) comprising steps F, G, H, and J is executed repeatedly, once for each object class in the object model, to generate source code routines to create (Step F), retrieve (Step G), update (Step H), and delete (Step J) instances of that object class. The code generated by this loop can, for example, be C++ code where each object class in the object model is represented as a C++ class and the generated source code routines are represented as C++ routines (methods) associated with the class. Alternatively, any kind of general purpose programming language can be used to embody the code. It will be appreciated by those of skill in the art that the Steps F, G, H, and J, although conceptually distinct, can be combined or intertwined in some embodiments. Also it will be appreciated that in some embodiments each of the routines generated during the loop can be implemented as a collection of smaller routines that perform subsets of the total functionality described here.

After the loop (Step E) is complete the code generated during the loop is output (Step K). The code can be stored, typically in a storage device such storage device 3. Alternatively or additionally, it can be displayed via user interface 5 or made available via memory 2 to the processor 1 or via network 7 to another processor for further processing.

After the generated code is output, optionally this code (that is, an executable form of this code) can be executed (Step L). Custom code can be added to the generated code, run-time libraries can be linked in, and the resulting software can be run. Execution can be performed subsequently to code generation. Execution can be carried out by processor 1 or by another processor.

5. Constructing the Database Schema and Transform

Figure 4:
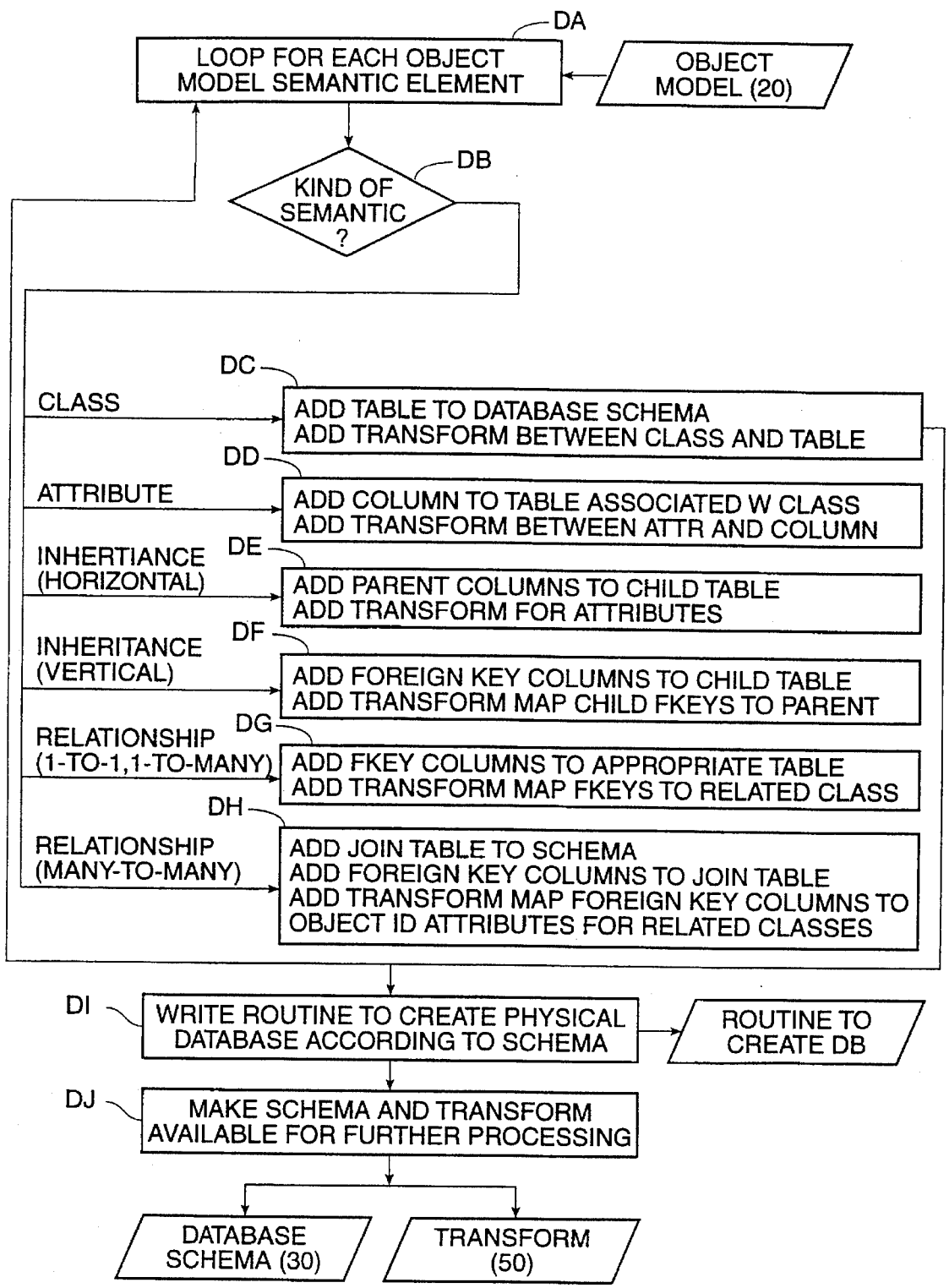
FIG. 4 is a flow chart representing the process for constructing the database schema and transform.

FIG. 4 illustrates in more detail the process for constructing the database schema 30 and transform 50 when the schema and transform are not accepted from an external source (Step D of FIG. 3). A loop (Step DA) is executed repeatedly, once for each semantic element of the object model. A test is made of the semantic element (Step DB). If the element defines a new class, a table is added to the database schema, and a corresponding transform is added to map that table to its related class (Step DC). For each attribute in the object model, a column is added to the database table schema and a corresponding transform is added to map that database column to the class attribute (Step DD).

For vertical inheritance, attributes and relationships are associated with the class in which they were defined. For horizontal inheritance, attributes and relationship are associated only with the lowest level child table of the database schema. For each vertically inherited parent class, foreign key columns are added that refer to the parent table and a transform is created to map these foreign key columns to the class inheritance property (Step DF). It will be appreciated that these primary key columns of each child table can also serve as foreign key columns which point to the parent table. For each horizontally inherited parent class, the attributes and relationships of the parent class are added to the schema for the current class (Step DE). Alternatively, a type code column can be added to the table to differentiate between child classes.

For each one-to-one and one-to-many relationship in the object model, a foreign key column or foreign key columns are added to the database table schema in the appropriate table (Step DG). For each many-to-many relationship in the object model, a separate join table is added to the database schema (Step DH). This table contains foreign key references to each of the two related tables. In either case (that is, for any relationship) a corresponding transform is also created to map the foreign key columns to the class relationship.

Once the loop for all objects has been completed, construction of the schema 30 and transform 50 is complete. Next the method writes a routine which, when converted to an executable form which is then executed, creates a structured database corresponding to the database schema 30 generated by the method (Step DI). Finally, the database schema 30 and transform 50 are made available for further processing (Step DJ), for example, by writing the information to storage device 3.

6. Details of Method Steps to Generate Routines

For each class in the object model 20, the method generates a minimal set of operations to manipulate an object instance of the class and other object instances to which it is related or from which it inherits. More specifically, for each object class, four types of routines are written. These routines provide the functions of creating, retrieving, updating, and deleting instances of that object class. For each routine the method iterates through the object model to draw out the implications of each object model semantic element for that routine and object class. In other words, the method looks through the object model and finds every semantic element in the object model—that is, every attribute, relationship, or inheritance—that needs to be considered in order to write the given routine for the given object class, and incorporates this information when writing the routine. Once again, it will be appreciated that in some embodiments each of the routines generated during the loop can be implemented as a collection of smaller routines that perform subsets of the total functionality described here.

It will be appreciated that the method uses techniques similar to those used in a programming language compiler. In the method, however, the "programming language" comprises an object model and, optionally, a database schema and transform, and the output of the "compiler" is the source code that is generated.

6.1 Steps to generate a routine to create an object instance

Figure 5A:
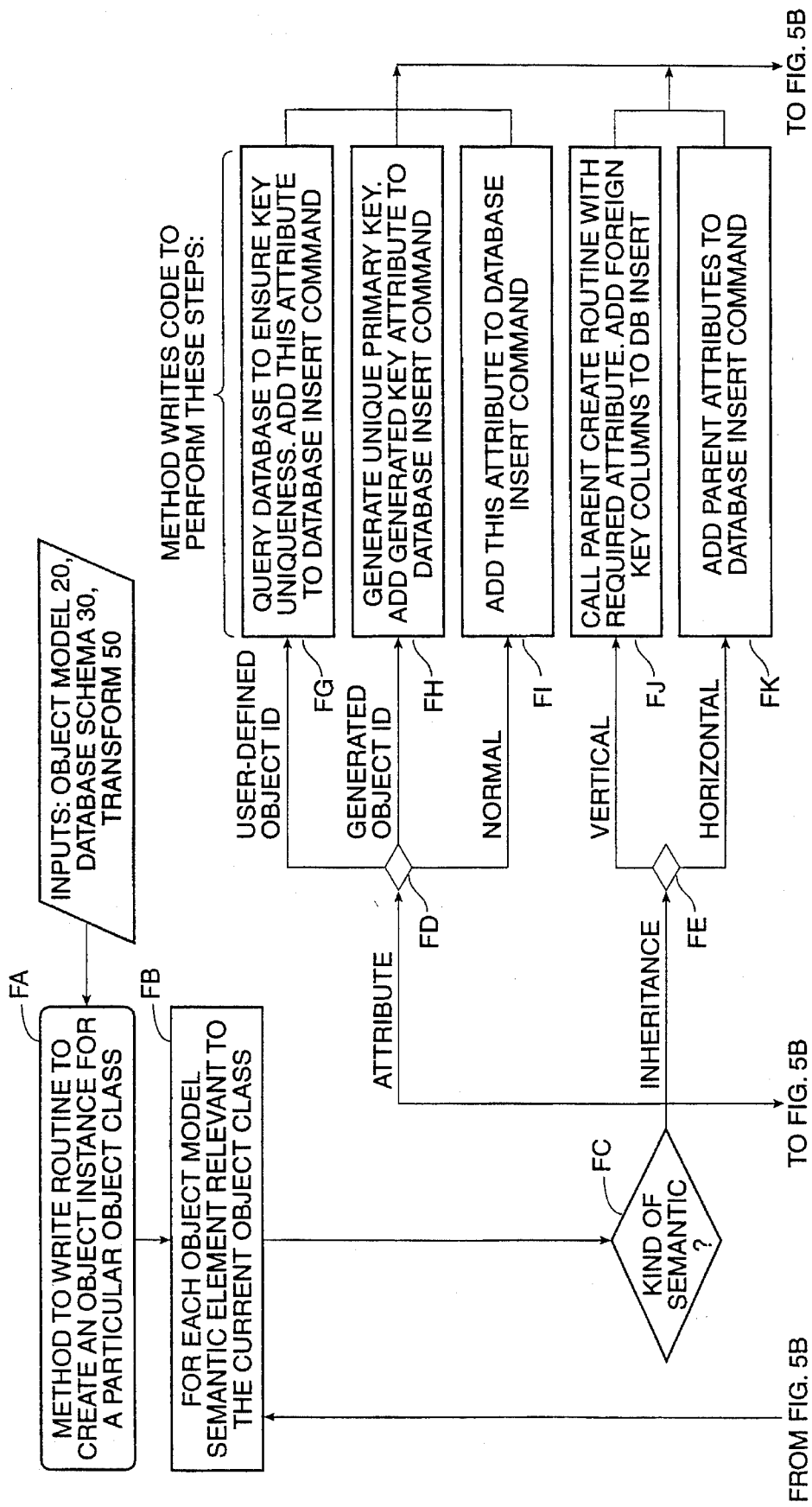
FIG. 5 is a flow chart representing the process for writing code which when executed creates an object instance and its corresponding structured information in the database.
Figure 5B:
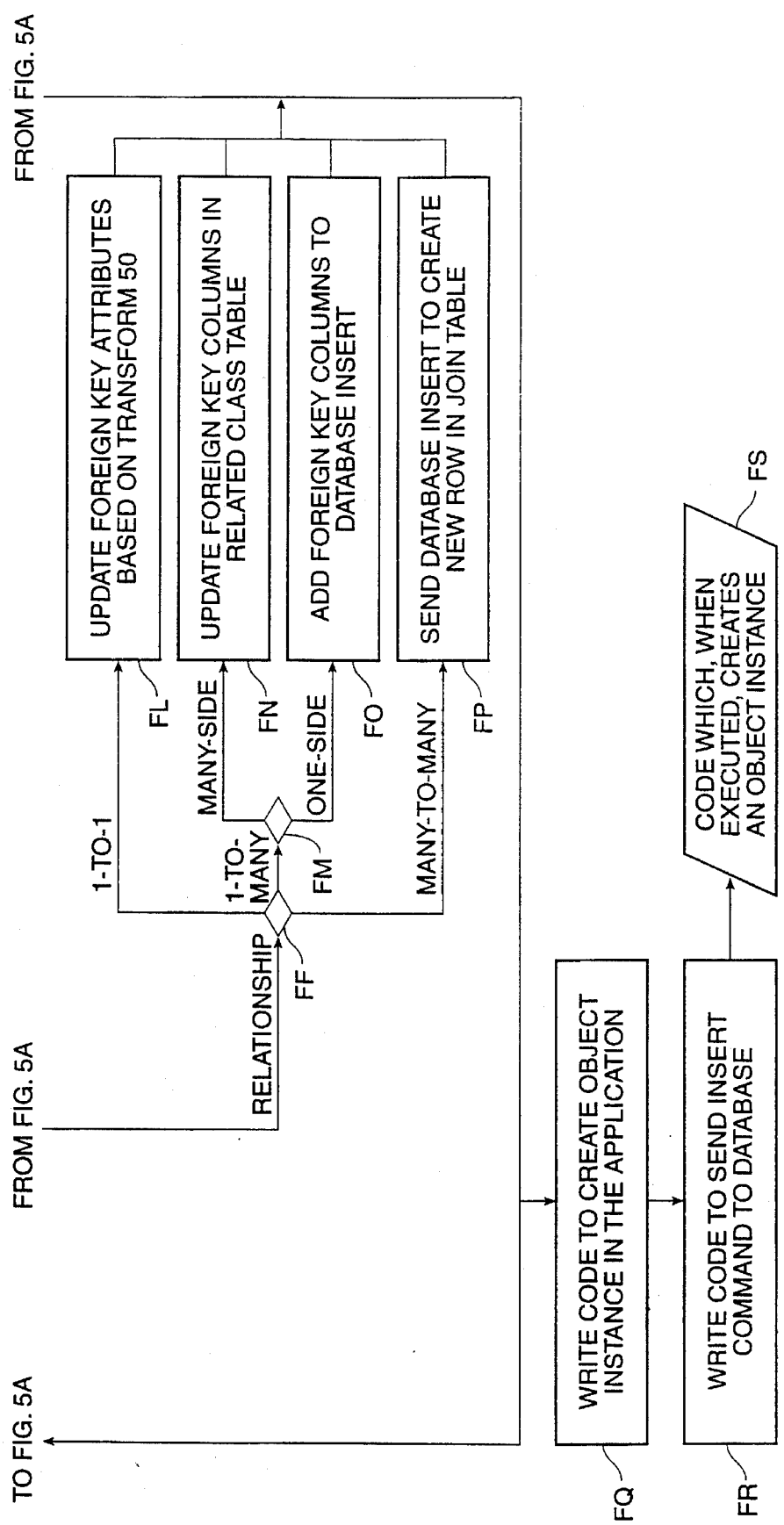

The flow chart of FIG. 5 expands step F of FIG. 3 to provide additional detail. It illustrates the steps to generate a create routine for a particular object class (Step FA).

The method performs a loop for each object model semantic element relevant to this class (Step FB). To find these elements the method scans the entire object model and extracts semantics that define the attributes, inheritances, and relationships for this class. Depending on the kind of semantic found (Step FC), the method generates code to reflect the implications of the semantic in the create routine. For an object model semantic that defines an attribute of the class (Step FD), the method performs steps that depend on the kind of attribute. If the attribute is defined as being part of the object ID (Step FG), the method writes code that when executed (that is, when converted to an executable form which is then executed) forms a query to the database to ensure that the combination of primary key attributes define a unique object instance. If the object model indicates that the object ID attribute is to be generated by the method (Step FH), the method writes code that when executed will generate automatically a unique primary key value for the object instance being created. For all other attribute types (Step FI), the attribute value for this instance is added to the database insert command (see below).

For an object model semantic specifying that this object class inherits from a parent class, the method determines the type of inheritance (Step FE). If the inheritance is vertical (Step FJ), the method writes code which when executed will call the create routine for a parent instance and pass that routine the inputs it requires. If the inheritance is horizontal (Step FK), the method adds the parent class attributes to the database insert statement for the object instance that this routine creates.

For an object model semantic that specifies a relationship between this object class and another object class, the method determines the type of relationship (Step FF). If the relationship is one-to-one, the method uses the transform 50 to determine which database table contains the foreign key information for this relationship. The method then writes code that when executed updates that table to reflect a primary-foreign key relationship between the two tables. For example, if each employee can have one car, it can be the case that a car table contains a foreign key which points to the employee table (e.g., the employee's ID number), or it can be the case that the employee table contains a foreign key which points to the car table (e.g., the car's license plate number). The transform 50 tells the method which of these two is in fact the case—or more generally, where the foreign key information for a given relationship is stored.

If the relationship is one-to-many (Step FM), the method determines which "side" of the relationship this object class is on-that is, whether this object class is on the "1" side or the "many" side of the relationship. If this class is on the "1" side of a one-to-many relationship (e.g., an employee can work in only one department), foreign key information for the relationship can be stored in this class. Accordingly, the method generates code which when executed uses the object ID attributes of the related instance to set the foreign key column values for the instance being created (Step FO). If this class is on the "many" side of the relationship (e.g., a department can have many employees), the method writes code which when executed will update the foreign key for the related class to point to the primary key of the object instance being created (Step FN).

If the relationship is many-to-many (Step FP), the method generates code that when executed sends a database insert command to create a new row in the join table which connects the two related classes. This row will contain foreign key pointers to each of the two related instances. For example, if an employee is related to a project through a many-to-many relationship, this relationship will be created by adding a row to the assignment table which "points to" a particular employee and a particular project, thereby joining the two.

After all the semantic elements of the object model are interpreted, the method writes code which when executed will create an object instance of the given class in the object-oriented application (Step FQ). For example, in the C++ language, an instance is created which has all the attributes defined in the object model, which has pointers or arrays to represent its relationships and which uses built-in language constructs to represent inheritance. Also, the method writes code that when executed will send an insert command or commands to the database to store in the database all the information for this new object instance (Step FR). These database commands insert rows into the database that correspond to the attribute values of the new object instance and its parent instances. Further, these commands update rows in the database tables associated with related object instances to reflect the relationships between the new instance and the related instances.

The code to create the new object instance (which was generated in Step FQ) and the code to make the associated changes to the database (which was generated in step FR) are combined in a single routine. This routine, which is a routine to create an object instance of this class, is made available for further processing (Step FS). When executed, this routine will take as inputs the attributes of the object instance to be created, the attributes of the ancestor instances to be inherited by the new object instance, and the related instances to which the new object instance will be associated. Its output will be a new object structure in the application consisting of the new object instance and its relationships and inheritances with other instances, and a corresponding data structure in the database. A benefit of this routine is that it creates the database structure transparently. The developer has only to call the routine in the object-oriented application; the corresponding data structure in the database is created automatically.

6.2 Steps to generate a routine to retrieve an object instance

Figure 6A:
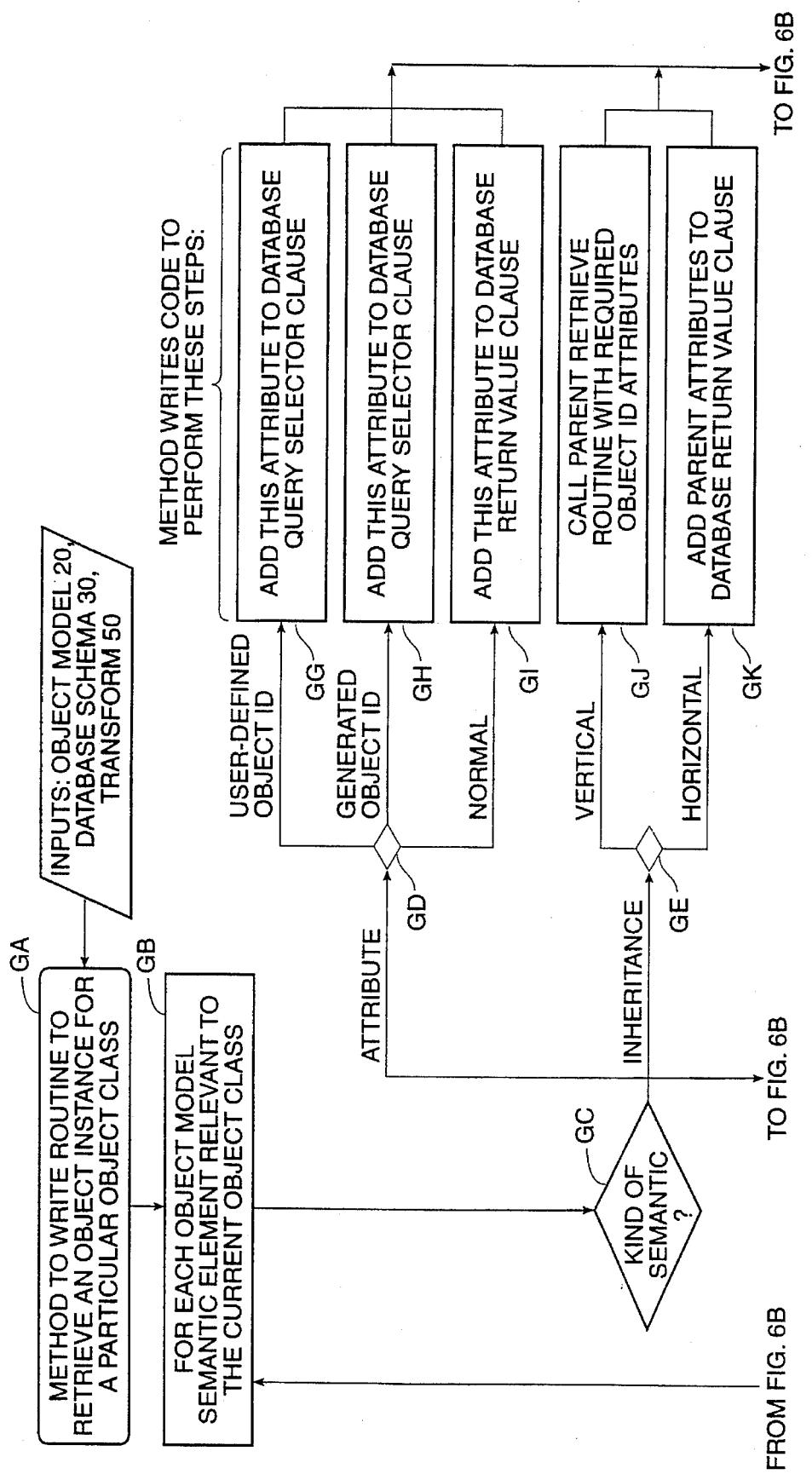
FIG. 6 is a flow chart representing the process for writing code which when executed retrieves an object instance base on its corresponding structured information in the database.
Figure 6B:
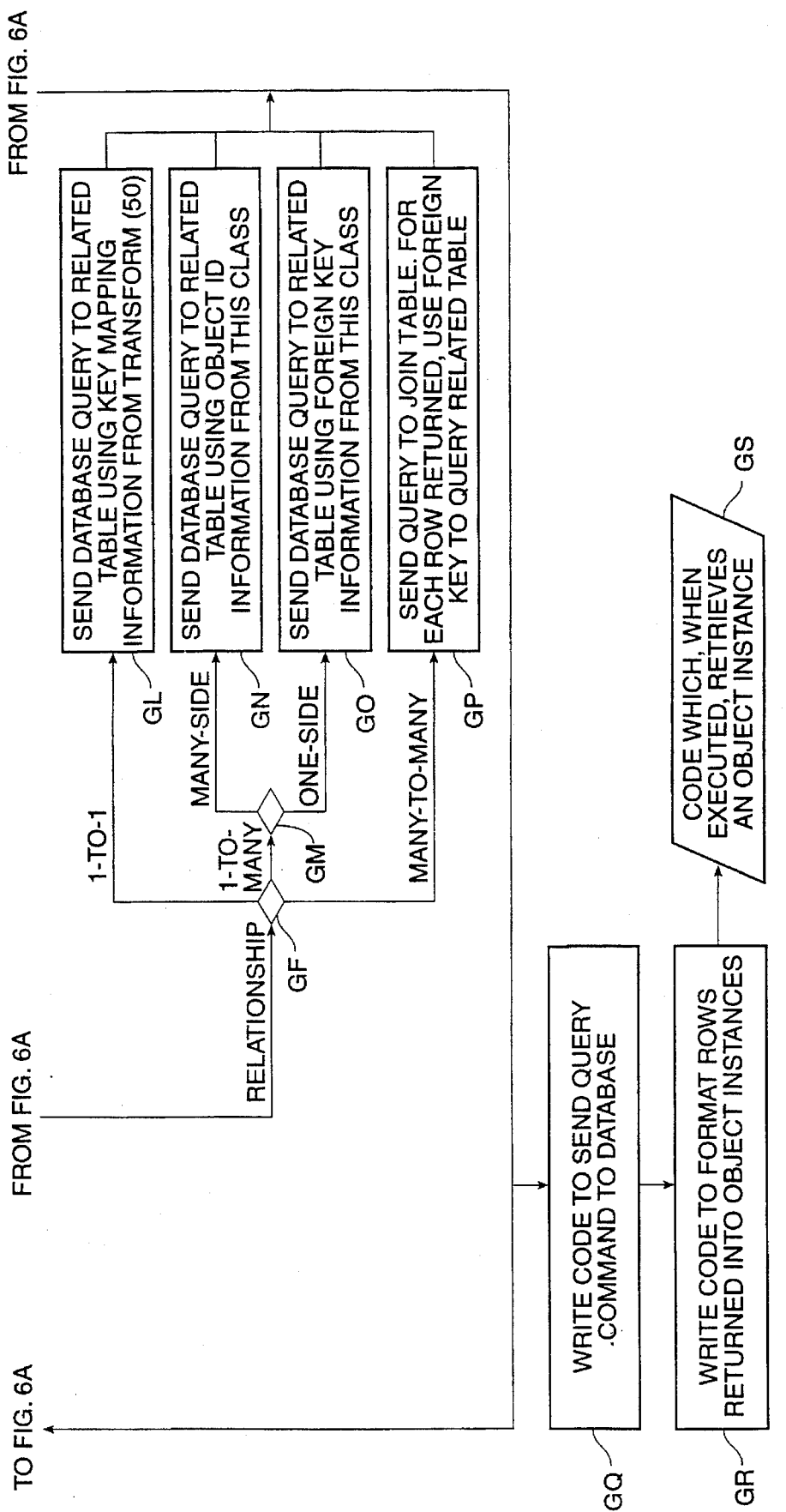

The flow chart of FIG. 6 expands on Step G of FIG. 3 to give additional detail. It illustrates the steps to generate a retrieve routine for a particular object class (Step GA).

The method performs a loop for each object model semantic element relevant to this class (Step GB). To find these elements the method scans the entire object model and extracts semantics that define the attributes, inheritances, and relationships for this class.

Depending on the kind of semantic found (Step GC), the method generates code to reflect the implications of that semantic in the retrieve routine. For an object model semantic that defines an attribute of the class (step GD), the method performs steps that depend on the kind of attribute. If the attribute is defined as being part of the object ID (step GG), the method writes code that when executed adds that attribute to the query selector clause. The selector clause will be used to retrieve the row from a database table whose primary key columns match the attribute values in the selector clause. If the object model indicates that the primary key attribute has been generated by the method (Step GH), the method writes code that when executed will add that attribute value to the query selector clause. For all other attribute types (Step GI), the attribute name is added to the query return clause (see below).

For an object model semantic specifying that this object class inherits from a parent class, the method determines the type of inheritance (Step GE). If the inheritance is vertical (Step GJ), the method writes code which when executed will call the retrieve routine for a parent instance and pass that routine its required inputs. If the inheritance is horizontal (Step GK), the method adds the parent class attributes to the database query return clause for this (child) class.

For an object model semantic that specifies a relationship between this object class and another object class, the method determines the type of relationship (Step GF). If the relationship is one-to-one, the method uses the transform 50 to determine which database table contains the foreign key information for this relationship. The method then writes code that when executed queries the related table based on the primary-foreign key relationship between the two tables.

If the relationship is one-to-many (Step GM), the method determines which "side" of the relationship this object class is on—that is, whether this object class is on the "1" side or the "many" side of the relationship. If this class is on the "1" side of a one-to-many relationship, the method generates code which when executed sends a database query to the related table using the foreign key attributes for this instance (Step GO). For example, if an employee object instance "John" is related to a department object instance "Engineering," the employee will contain a foreign key attribute, "Engineering," which "points to" John's department. To generate code to retrieve the department related to "John," the method writes code which when executed will select the department named "Engineering" from the department table in the database. If the object class is on the "many" side of the relationship, the method writes code which when executed will send a query to the database to access the related database table using the primary key of this class (Step GN). For example, to generate code to retrieve the employees related to the "Engineering" department, the method writes code which when executed will select all employees with the foreign key "Engineering" from the employee table in the database.

If the relationship is many-to-many (Step GP), the method generates code that when executed sends a database query command to the join table which connects the two related classes with the primary key of this object instance as the selector. For each row returned by this query, the method writes code which when executed sends a query to the related table using the join table foreign key as a selector. For example, if an employee, "John" is related to a project, "Vacation Policy," through a many-to-many relationship, the first step will be to query the join table, "Assignments," for all assignments which "point to" John through their foreign key. For each row returned from this query, a second query can be issued to obtain the project related to that join table row through the foreign key relationship. In this example the assignment table would contain a row pointing to both "John" and "Vacation Policy."

After all the semantic elements of the object model are interpreted, the method writes code that when executed will send a query command or commands to the database to retrieve from the database all the information for a particular object instance (Step GQ). These query commands will retrieve rows in the database that correspond to the primary key values of the object instance being retrieved or the foreign key values for the appropriate object instances. The method also writes code which when executed will format the rows returned from the database into object instances in the object-oriented application (Step GR). For example, in the C++ language, an object instance is created based on data retrieved from the database. This object instance contains all the attributes defined in the object model, has pointers or arrays to its related object instances, and uses built-in language constructs to represent its inheritances.

The code to retrieve object instance information from the database (which was generated in Step GQ) and the code to create the retrieved object instance information from the database (which was generated in Step GR) are combined in a single routine. This routine is made available for further processing (Step GS). When executed, this routine will take as inputs the primary key attributes for the object instance to be retrieved. Its output will be a new object structure in the application consisting of the retrieved object instance (that is, the object instance formed from the results of the database query) and its relationships and inheritances with other object instances. Put another way, whereas the create routine described above with reference to FIG. 5 creates an object instance for which no corresponding data is yet present in the database, the retrieve routine described here with reference to FIG. 6 creates an object instance for which corresponding data is already present in the database.

6.3 Steps for generating a routine to update an object instance

Figure 7A:
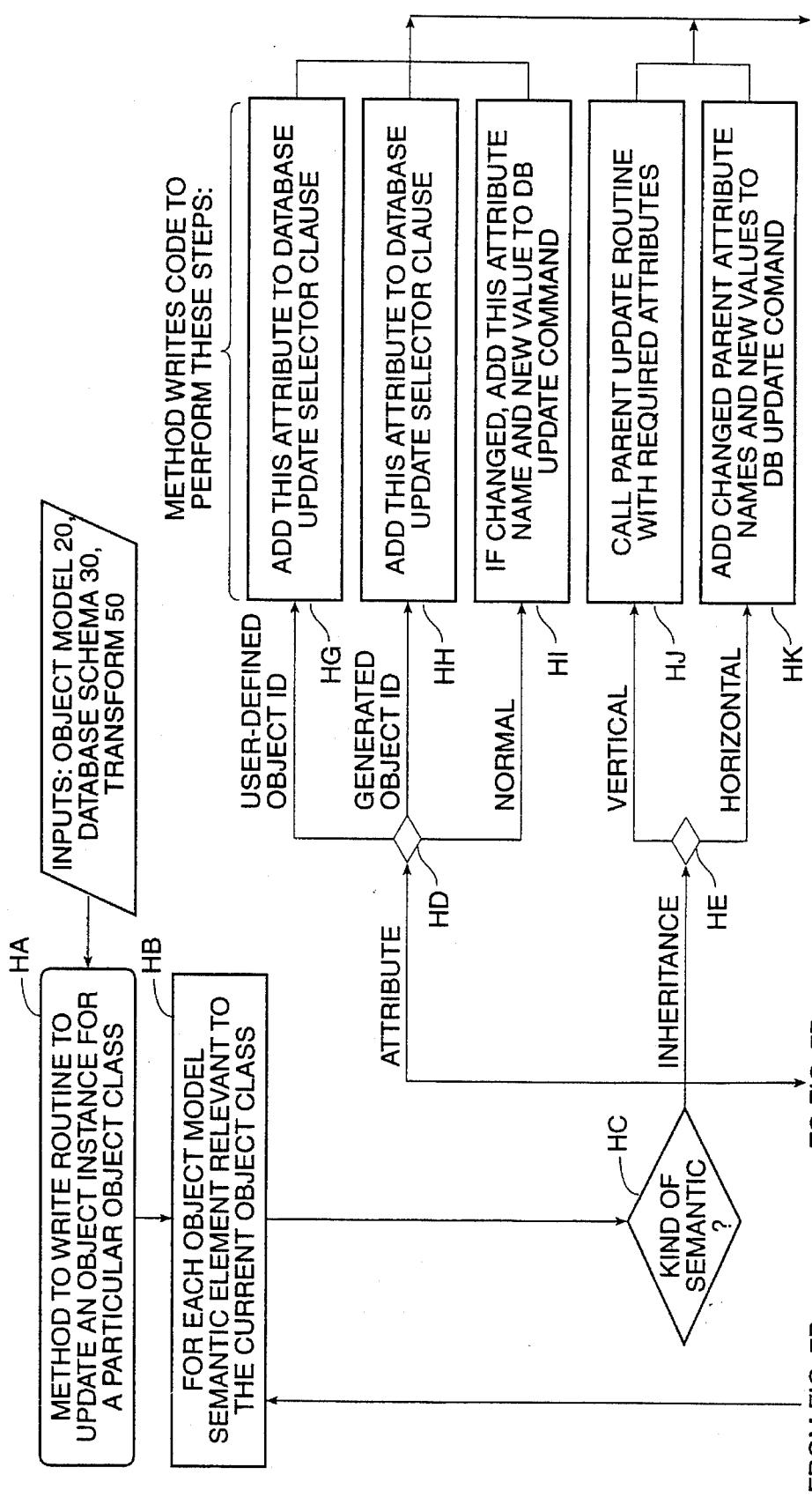
FIG. 7 is a flow chart representing the process for writing code which when executed updates an object instance and its corresponding structured information in the database.
Figure 7B:
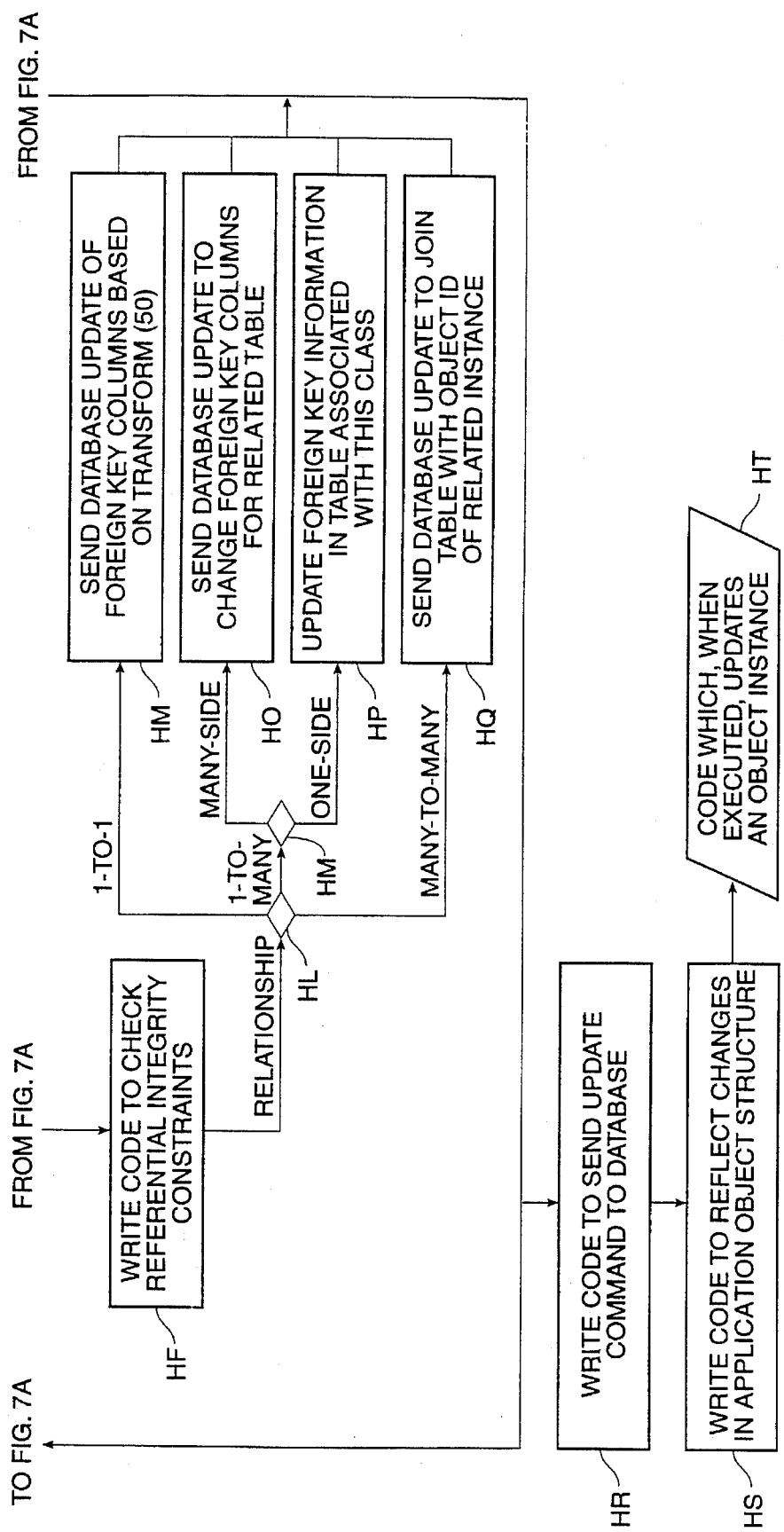

The flow chart of FIG. 7 expands on Step H of FIG. 3 to give additional detail. It illustrates the steps to generate an update routine for a particular object class (Step HA).

The method performs a loop for each relevant object model semantic element for this class (Step HB). To find these elements the method scans the entire object model and extracts semantics that define the attributes, inheritances, and relationships for this class.

Depending on the kind of semantic found (Step HC), the method generates code to reflect the implications of that semantic in the update routine. For an object model semantic that defines an attribute of the class (step HD), the method performs steps that depend on the kind of attribute. If the attribute is defined as being part of the object ID (step HG), the method writes code that when executed adds that attribute to the update selector clause. The selector clause will be used to update the row from a database table whose primary key columns match the attribute values in the selector clause. If the object model indicates that the object ID attribute has been generated by the method (Step HH), the method writes code that when executed will add that attribute value to the update selector clause. For all other attribute types (Step HI), the changed attribute name and new value are added to the update command.

For an object model semantic that specifies that this object class inherits from a parent class, the method determines the type of inheritance (Step HE). If the inheritance is vertical (Step HJ), the method writes code which when executed will call the update routine for a parent instance and pass that routine its required inputs. If the inheritance is horizontal (Step HK), the method adds the changed parent class attributes to the database update command for this (child) class.

For an object model semantic that specifies a relationship between this object class and another object class, the method writes code which when executed checks the referential integrity constraints for this relationship (Step HF). That is, it must be ensured that foreign key references in the database remain valid after the update.

Thereafter the method determines the type of relationship (Step HL). If the relationship is one-to-one, the method uses the transform 50 to determine which database table contains the foreign key information for this relationship. The method then writes code that when executed updates the related table based on the primary-foreign key relationship between the two tables (Step HM).

If the relationship is one-to-many, the method determines the "side" of the relationship upon which this object class is, i.e., whether this object class is on the "1" side or the "many" side of the relationship (Step HN). If this class is on the "1" side of a one-to-many relationship, the method generates code which when executed adds primary key attributes for the related instance to the database update command for this instance (Step HP). If the object class is on the "many" side of the relationship, the method writes code which when executed will send an update to the database to set the foreign key attributes in the related table to the primary key for the object instance given as input to the update routine (Step HO).

If the relationship is many-to-many (Step HQ), the method generates code that when executed sends a database update command to the join table which connects the two related classes with the primary key of the object instance given as input to the update routine as the update selector. In other words, the join table will be updated to "point to" a new related object.

After all the semantic elements of the object model are interpreted, the method writes code that when executed will send an update command or commands to the database to store in the database all the information for the object instance given as input to the update routine (Step HR). These update commands alter rows in the database that correspond to the primary key values of the object instance being updated or the foreign key values for the relationships for the object instance being updated. The method also writes code which when executed will update the application object structure to reflect the changes made to the database (Step HS). For example, if the database update fails, the object instance will not be changed in the object-oriented application. The method ensures that at all times the information in the database properly reflects the information in the object-oriented application.

The code to update the database (which was generated in step HR) and the code to reflect the database changes in the object-oriented application (which was generated in Step HS) are combined into a routine to update an object instance, which is made available for further processing (Step HT). When executed, this routine will take as inputs the object instance to be updated and the changes to be made. Its output will be an updated object structure in the application consisting of the updated object instance and its updated relationships and inheritances with other object instances, and corresponding changes in the database. A benefit of this routine is that changes to the database are made transparently based on changes to the object instance.

6.4 Steps to generate a routine to delete an object instance

Figure 8A:
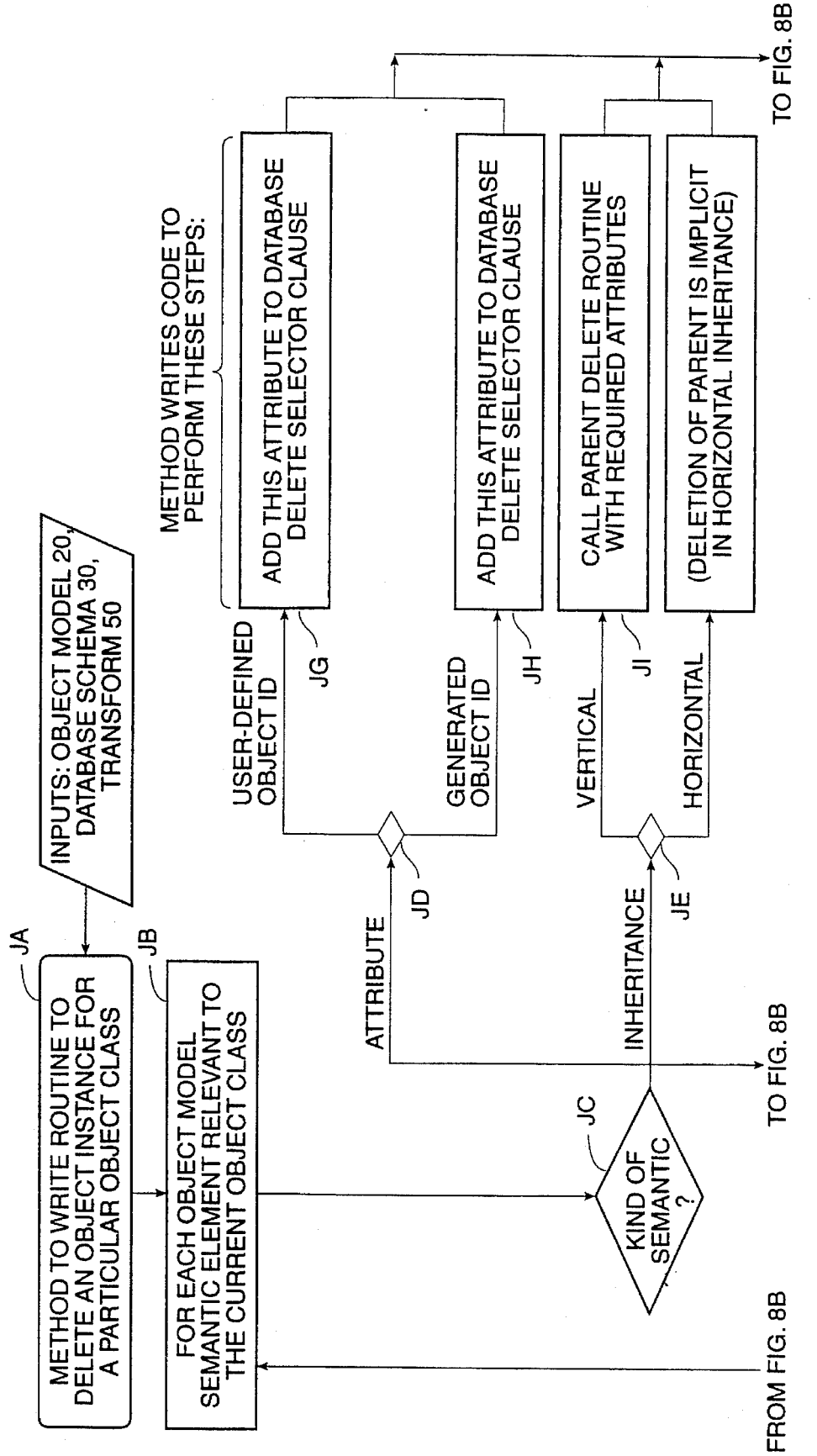
FIG. 8 is a flow chart representing the process for writing code which when executed deletes an object instance and makes corresponding changes to structured information in the database.
Figure 8B:
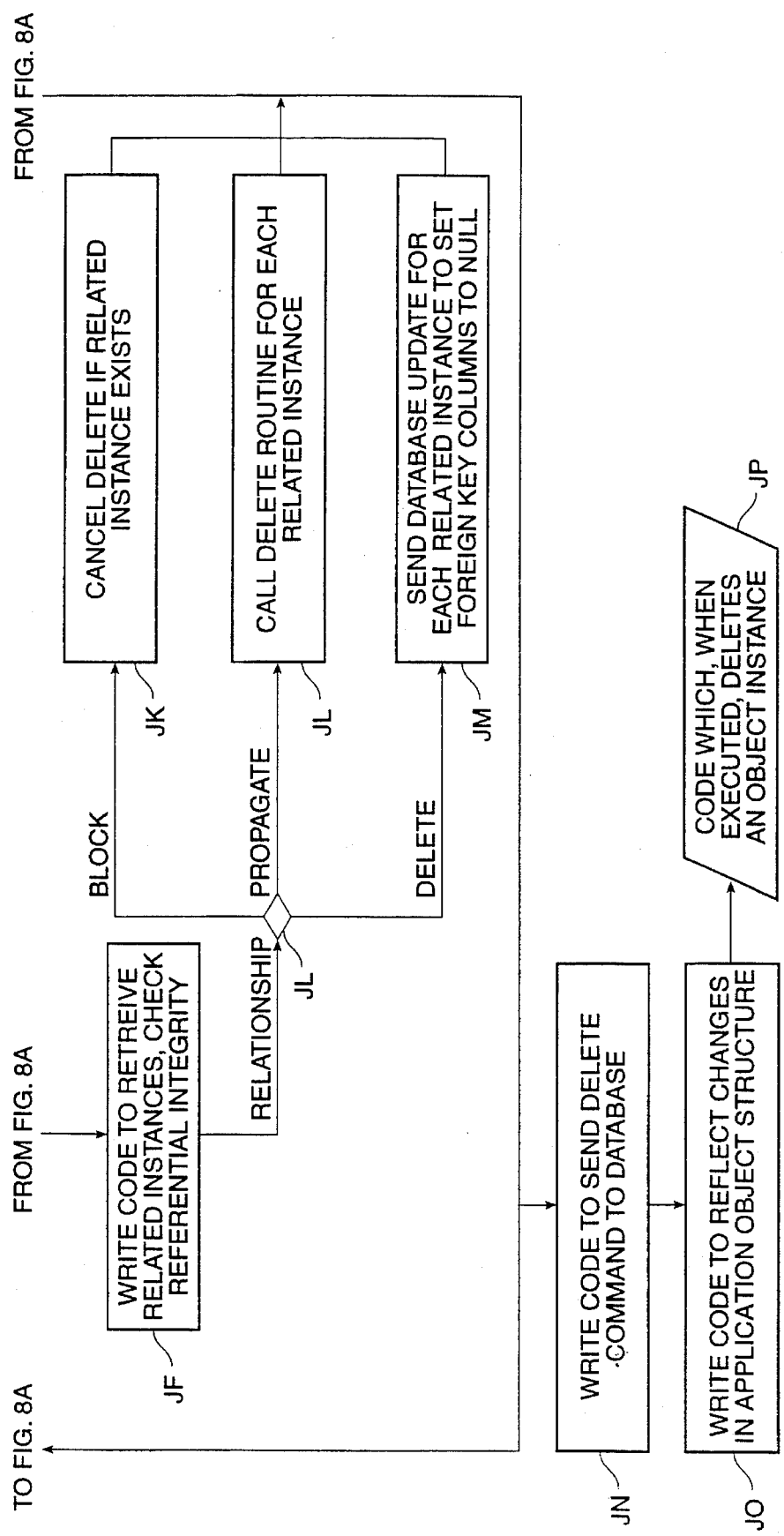

The flow chart of FIG. 8 expands on Step J of FIG. 3 to give additional detail. It illustrates the steps to generate a delete routine for a particular object class (Step JA).

The method performs a loop for each relevant object model semantic element for this class (Step JB). To find these elements the method scans the entire object model and extracts semantics that define the attributes, inheritances, and relationships for this class.

Depending on the kind of semantic found (Step JC), the method generates code to reflect the implications of that semantic in the delete routine. For an object model semantic that defines an attribute of the class (step JD), the method performs steps that depend on the kind of attribute. If the attribute is defined as being part of the object ID (step JG), the method writes code that when executed adds that attribute to the delete selector clause. The selector clause will be used to delete the row from a database table whose primary key columns match the attribute values in the selector clause. If the object model indicates that the object ID attribute has been generated by the method (Step JH), the method writes code that when executed will add that attribute value to the delete selector clause.

For an object model semantic specifying that this object class inherits from a parent class, the method determines the type of inheritance (Step JE). If the inheritance is vertical (Step JI), the method writes code which when executed will call the delete routine for a parent instance and pass that routine its required inputs. (In the case of horizontal inheritance, the database information associated with the parent instance will be automatically deleted when the child instance is deleted.)

For an object model semantic that specifies a relationship between this object class and another object class, the method writes code that when executed retrieves all the object instances related to the object instance to be deleted (Step JF). Next, the method determines the proper delete action for the relationship (Step JJ). If the delete action specified by the object model is "block" (Step JK), the delete routine will be cancelled if there are any object instances related through this relationship. For example, if there any employees related to a particular department, an attempt to delete that department would fail if the delete action for the relationship is block. If the delete action is "propagate" (Step JL), the delete routine is called for each related instance. For example, if the delete action is Propagate, an attempt to delete a department would also delete all the employees in that department. If the delete action is "remove" (Step JM), the relationship pointer for each related object instance will be set to null, or the relationship information will be deleted from the join table. For example, if the delete action is Remove, an attempt to delete a department would succeed and would remove the relationship pointer between each employee and that department.

After all the semantic elements of the object model are interpreted, the method writes code that when executed will send a delete command or commands to the database to delete from the database all the information for a particular object instance (Step JN). These delete commands remove rows in the database that correspond to the primary key values of the object instance being deleted and update or delete rows that correspond to foreign key values for the object instance to which the deleted object is related. Once this information has been deleted from the database, the method writes code which when executed will update the object instances in the object-oriented application appropriately (Step JO). In particular, the changes may not succeed (e.g., if blocked) or may propagate to other object instances causing widespread changes to object instances in the object-oriented application.

The code to modify the database (which was generated in step JN) and the code to reflect the database changes in the object-oriented application (which was generated in step JO) are combined into a routine to delete an object instance, which is made available for further processing (Step JP). When executed, this routine will take as input the object instance to be deleted. Its output will be an updated object structure in the application and corresponding changes in the database. A benefit of this routine is that changes to the database are made transparently based on the deletion of an object instance.

7. Conclusion

The invention provides a method and apparatus for using an object model of an object-oriented application to automatically map information between an object-oriented application and a structured database, such as a relational database. The invention uses an object model to impose semantics on the object classes of an object-oriented application and on the data from a structured database, such that operations on the object classes are automatically and transparently reflected in the database. The object classes of the object model provide a much more powerful representation of the real world than is provided by the structured database, in particular because they encapsulate notions of inheritance and relationships. What the user sees is simply an object-oriented system, with no explicit reference whatsoever to the structured database. The method can be used also with two or more different databases, with the object model transparently integrating them. The invention can be used where a site or a company has a plurality of incompatible, pre-existing databases (legacy databases) that need to be integrated in a single application. The update routines that the invention generates for each object class change all databases transparently, so that the user or programmer sees only the objects and not the databases.

Furthermore, the invention allows significant flexibility in customizing the generated routines. For example, each routine generated according to the method can optionally call an externally generated (e.g., by a programmer) "notification hook" routine just before or just after the generated routine performs its operations. In this notification hook routine, custom source code can be added to perform additional operations and thereby modify the behavior of the object class. For example, a notification hook routine called just before performing the create routine for the tire class object can assign a serial number to the tire instance being created.

Significant flexibility is also allowed in the choice of database used by the invention. The invention shields the user or programmer from any knowledge of the underlying database or databases. That is, the routines generated according to the method are identical, regardless of the underlying database. Thus a user can switch databases by changing only a run-time object management library, without having to make any other changes to the object-oriented application.

Still further variations and extensions will be apparent to those of skill in the art within the scope of the invention.

The invention has been explained with reference to specific embodiments. Other embodiments are contemplated without departing from the spirit and scope of the invention. For example, the invention can be used not only with relational data, but also any field-delimited data, such as spreadsheet databases, hierarchical databases or flat file databases which are field delimited. It is therefore not intended that this invention be limited, except as indicated by the appended claims.

What is claimed is:

1. A method for automatically mapping information of an object said information comprising the object attributes, relationships, and inheritances between an object-oriented application and a structured database, said method being carried out using a digital computing system comprising a processor, said method comprising the steps of:

executing instructions on said processor to load into temporary storage an object model, said object model comprising a plurality of semantic elements, said semantic elements being less complex than object class source code definitions, representing a plurality of object classes and a plurality of relationships between said plurality of object classes within said object-oriented application, each of said plurality of semantic elements comprising relationships between object classes, inheritances between object classes, and attributes of an object class comprising at least one object ID attribute;

executing instructions on said processor to automatically generate code by parsing said object model to identify the object classes and their relationships for which said code is generated and automatically generating class definitions and methods, said code being suitable for conversion to an executable form that when executed automatically maps said information between said object-oriented application and said structured database; and executing instructions on said processor to output to persistent storage said code.

2. A method for automatically mapping information of an object comprising the object attributes, relationships, and inheritances between an object-oriented application and a structured database, said method being carried out using a digital computing system comprising a processor, said method comprising the steps of:

executing instructions on said processor to load into temporary storage an object model, said object model comprising a plurality of semantic elements, said semantic elements being less complex than object class source code definitions, representing a plurality of object classes and a plurality of relationships between said plurality of object classes within said object-oriented application, each of said plurality of semantic elements comprising relationships between object classes, inheritances between object classes, and attributes of an object class comprising at least one object ID attribute;

executing instructions on said processor to load into temporary storage for processing a database schema that represents the structure of data in said structured database, said structured database comprising tables, columns, primary keys, foreign keys, and join tables;

executing instructions on said processor to load into temporary storage for processing a transform that represents a mapping between said object model and said database schema, said transform having the further capability of being modified;

executing instructions on said processor to automatically generate code by parsing said object model to identify the object classes and their relationships for which said code is generated, parsing said database schema to identify the database tables used to store the object class instances, and parsing said transform to identify the mapping of said object classes, and relationships between said database tables and said object classes, said code being suitable for conversion to an executable form that when executed automatically maps said information between said object-oriented application and said structured database;

executing instructions on said processor to generate code for each object class, including code for four routines associated with said object class, said four routines being:

a routine to create an instance of said object class;
a routine to retrieve an instance of said object class;
a routine to update an instance of said object class; and
a routine to delete an instance of said object class, each of said four routines based on said semantic elements of said object model; and executing instructions on said processor to output to persistent storage said code.

3. The method of claim 2 wherein said step of executing instructions on said processor to load into temporary storage for processing a database schema comprises executing instructions on said processor to load into temporary storage from persistent storage said database schema, and wherein said step of executing instructions on said processor to load into temporary storage for processing a transform comprises executing instructions on said processor to load into temporary storage from persistent storage said transform.

4. The method of claim 2 wherein said computing system further comprises an input means coupled to said processor, wherein said step of executing instructions on the processor to load into temporary storage for processing a database schema comprises executing instructions on said processor in conjunction with said input means to input said database schema, and wherein said step of executing instructions on said processor to load into temporary storage for processing a transform comprises executing instructions on said processor in conjunction with said input means to input said transform.

5. The method of claim 2 wherein said step of executing instructions on said processor to load into temporary storage for processing a database schema comprises executing instructions on said processor to construct said database schema by loading said object model into temporary storage, locating object classes and relationships within said object model, creating said database schema comprising semantic representations of tables representing said object classes and relationships of said object model such that said database schema represents a database capable of storing said elements of said object model, and wherein said step of executing instructions on said processor to load into temporary storage for processing a transform comprises executing instructions on said processor to construct said transform by loading said object model into temporary storage, locating object classes and relationships within said object model, creating said transform comprising mappings between said object classes and relationships of said object model and said tables of said database schema such that said transform is capable of mapping said elements of said object model from said object oriented application to said structured database.

6. The method of claim 2 wherein said step of executing instructions on said processor to load into temporary storage an object model comprises executing instructions on said processor to load into temporary storage an object model;

wherein said step of executing instructions on said processor to load into temporary storage for processing a database schema said database schema describing tables organized in rows and columns, each one of said tables having at least one primary key column that uniquely identifies rows in each said table; and wherein said step of executing instructions on said processor to load into temporary storage for processing a transform includes executing instructions on said processor to load into temporary storage for processing a transform that comprises a set of mappings between said semantic elements of said object model and said database schema.

7. The method of claim 6 wherein said step of executing instructions on said processor to automatically generate code further comprises executing instructions on said processor to generate code which performs a mapping from each one of said object classes from said object model to at least one table described by said database schema, according to said mappings of said transform.

8. The method of claim 6 wherein said step of executing instructions on said processor to automatically generate code further comprises executing instructions on said processor to generate code which performs a mapping from said object ID attributes from said object model to primary key columns in at least one table described by said database schema, according to said mappings of said transform.

9. The method of claim 6 wherein said step of executing instructions on said processor to automatically generate code further comprises executing instructions on said processor to generate code which performs a mapping from attributes from said object model to columns in a single table described by said database schema, according to said mappings of said transform.

10. The method of claim 6 wherein said step of executing instructions on said processor to automatically generate code further comprises executing instructions on said processor to generate code for implementing a one-to-one relationship between object classes of said object model by generating code that references at least one foreign key column in at least one table described by said database schema, said foreign key column being capable of use in said create, retrieve, update, and delete routines for preserving said one-to-one relationship between said object classes, and said foreign key column being specified according to said mappings of said transform.

11. The method of claim 6 wherein said step of executing instructions on said processor to automatically generate code further comprises executing instructions on said processor to generate code implementing a one-to-many relationship between object classes of said object model by generating code that references at least one foreign key column in at least one table of said database schema, said foreign key column being capable of use in said create, retrieve, update, and delete routines for preserving said one-to-many relationship between said object classes, and said foreign key column being specified according to said mappings of said transform.

12. The method of claim 6 wherein said step of executing instructions on said processor to automatically generate code further comprises executing instructions on said processor to generate code implementing a many-to-many relationship between object classes of said object model in said structured database by generating code that references a join table described by said database schema, said join table containing foreign key references to primary key columns, said join table being capable of use in said create, retrieve, update, and delete routines for preserving said many-to-many relationship between said object classes, and said join table being specified according to said mappings of said transform.

13. The method of claim 6 wherein said step of executing instructions on said processor to automatically generate code further comprises executing instructions on said processor to generate code which implements the vertical inheritance between a child object class and a parent object class of said object model in said structured database by referencing at least one foreign key column in a table described by said database schema that corresponds to said child object class, representing said vertical inheritance according to said mappings of said transform.

14. The method of claim 6 wherein said step of executing instructions on said processor to automatically generate code further comprises executing instructions on said processor to automatically generate code which implements the horizontal inheritance between a child object class and a parent object class of said object model in said structured database by copying attributes of said parent object class from said object oriented application to a table described by said database schema corresponding to said child object class according to said mappings of said transform.

15. The method of claim 2 wherein said step of executing instructions on said processor to automatically generate code comprises executing instructions on said processor to automatically generate code for a plurality of object classes determined by said object model and a set of routines for each object class of said plurality, such that said routines operate on an instance in said object oriented application of said object class.

16. The method of claim 2 wherein said step of executing instructions on said processor to automatically generate code comprises executing instructions on said processor to automatically generate code for a plurality of object classes determined by said object model and a set of routines for each object class of said plurality, each said set comprising a routine for creating an object instance of said object class, said routine for creating an object instance of said object class being suitable for conversion to an executable form that when executed causes a new object instance to be created in said object-oriented application and further causes the attributes of said new object instance to be added to columns of tables of said structured database according to said database schema and said mapping of said transform, and further causes relationships and inheritance of said object model to be implemented by modifying columns, tables and keys in said structured database according said mapping of said transform.

17. The method of claim 2 wherein said step of executing instructions on said processor to automatically generate code comprises executing instructions on said processor to automatically generate code for a plurality of object classes determined by said object model and a set of routines for each object class of said plurality, each said set comprising a routine for retrieving an object instance of said object class from said structured database, said routine for retrieving an object instance being suitable for conversion to an executable form that when executed causes a new object instance to be created in said object-oriented application, said new object instance being initialized with attribute values, relationships, and inheritances determined according to information extracted from said structured database.

18. The method of claim 2 wherein said step of executing instructions on said processor to automatically generate code comprises executing instructions on said processor to automatically generate code for a plurality of object classes determined by said object model and a set of routines for each object class of said plurality, each said set comprising a routine for updating an object instance of said object class, said routine for updating an object instance being suitable for conversion to an executable form that when executed causes modifications to the database tables, columns and keys representing the object instance in said structured database and further causes the attribute values, inheritances, and relationships of said object instance in said object-oriented application to be modified to reflect said modifications to said database tables, columns, and keys representing the object instance in said structured database.

19. The method of claim 2 wherein said step of executing instructions on said processor to automatically generate code comprises executing instructions on said processor to automatically generate code for a plurality of object classes determined by said object model and a set of routines for each object class of said plurality, each said set comprising a routine for deleting an object instance of said object class, said routine for deleting an object instance being suitable for conversion to an executable form that when executed causes an object instance to be deleted in said object-oriented application and further causes the database tables, columns, primary keys, foreign keys, and join tables representing the object instance to be updated reflecting the deletion of the object instance from said object oriented application in said structured database.

20. The method of claim 2 wherein said step of executing instructions on said processor to automatically generate code comprises executing instructions on said processor to automatically generate a create routine for each object class in a plurality of object classes determined by said object model, said create routine comprising the step of generating an attribute of the object instance comprising the object ID by combining the attributes specified in said object model and transform as defining the object ID such that an object instance is uniquely identifiable within said structured database and said object oriented application.

21. The method of claim 19 wherein said step of automatically generating a delete routine for each object class in a plurality of object classes determined by said object model further comprises the step of canceling the deletion of an object instance in said structured database based on the existence of a blocking relationship between said object instance and a related object instance in said object model.

22. The method of claim 19 wherein said step of automatically generating a delete routine for each object class in a plurality of object classes determined by said object model further comprises the step of generating code to call a second delete routine for a related object instance based on the existence of a propagate relationship between said first object instance and said related object instance in said object model.

23. The method of claim 19 wherein said step of automatically generating a delete routine for each object class in a plurality of object classes determined by said object model further comprises the step of removing the columns, foreign keys, and join table entries in said structured database representing a remove relationship between a first object instance and a related object instance based on the existence of a remove relationship between said first object instance and said related object instance in said object model.

24. The method of claim 2 wherein said step of executing instructions on said processor to automatically generate code comprises executing instructions on said processor to automatically generate code for object classes and routines using as inputs said object model, said database schema, and said transform, at least one routine of said generated routines calling a notification hook routine in connection with the execution of said at least one routine of said generated routines, said notification hook routine being externally generated.

25. The method of claim 2 wherein said step of executing instructions on said processor to automatically generate code comprises executing instructions on said processor to automatically generate code for object classes and routines by loading into temporary storage from persistent storage said object model, said database schema, and said transform, including generating a source code routine to create at least one table in said structured database that corresponds to an object class in said object model.

26. A method for automatically mapping information between an object-oriented application and a plurality of structured databases, each of said structured databases comprising tables, columns, primary keys, foreign keys, and join tables, said method being carried out by executing instructions on a digital computing system comprising at least one processor, said method comprising the steps of:

executing instructions on a processor of said digital computing system to load into temporary storage an object model, said object model comprising a plurality of semantic elements, said semantic elements being less complex than object class source code definitions, representing a plurality of object classes and a plurality of relationships between said plurality of object classes within said object-oriented application, each of said plurality of semantic elements comprising relationships between object classes, inheritances between object classes, and attributes of an object class comprising at least one object ID attribute;

executing instructions on said processor to automatically generate code, said code being suitable for conversion to an executable form that when executed automatically maps said information between said object-oriented application and the structured databases of said plurality;

executing instructions on said processor to generate code for each object class, including code for four routines associated with said object class, said four routines being:

a routine to create an instance of said object class;

a routine to retrieve an instance of said object class;

a routine to update an instance of said object class; and a routine to delete an instance of said object class, each of said four routines based on said semantic elements of said object model; and executing instructions on said processor to output to persistent storage said code.

27. The method of claim 26 wherein said step of executing instructions on said processor to automatically generate code further comprises executing instructions on said processor to parse object classes from said object model and to generate code such that each one of said object classes maps to at least one table in at least one structured database of said plurality of structured databases.

28. A method for automatically generating code to support an object-oriented application that interacts transparently with a field-delimited database, said method performed by a processor coupled to an input means and an output means, said method comprising the steps of:

(a) executing instructions on said processor to enable a user to dynamically specify an object model to load into temporary storage by using said input means to select from a plurality of input fields representing said object model, said object model comprising a plurality of semantic elements, said semantic elements being less complex than object class source code definitions, representing a plurality of object classes and a plurality of relationships between said plurality of object classes within said object-oriented application, each of said plurality of semantic elements comprising relationships between object classes, inheritances between object classes, and attributes of an object class comprising at least one object ID attribute;

(b) executing instructions on said processor to load into temporary storage a database schema;

(c) executing instructions on said processor to load into temporary storage a transform, said transform representing a mapping between said object model and said schema;

(d) for each object class in said object model, executing instructions on said processor to generate code for each object class, including code for four routines associated with said object class, said four routines being:

a routine to create an instance of said object class;

a routine to retrieve an instance of said object class;

a routine to update an instance of said object class; and a routine to delete an instance of said object class, each of said four routines based on said semantic elements of said object model; and executing instructions on said processor and outputting to persistent storage the code thus generated.

29. An apparatus for automatically mapping information between an object-oriented application and a structured database, said apparatus comprising a digital computing system, said digital computing system comprising a first processor, a memory coupled to said processor, a user interface coupled to said processor, a storage device coupled to said processor, a network coupled to said processor, a second processor dedicated to a structured database coupled to said network and supporting said structured database, and:

means for executing instructions on said first processor to load into temporary storage an object model, said object model comprising a plurality of semantic elements, said semantic elements being less complex than object class source code definitions, representing a plurality of object classes and a plurality of relationships between said plurality of object classes within said object-oriented application, each of said plurality of semantic elements comprising relationships between object classes, inheritances between object classes, and attributes of an object class comprising at least one object ID attribute;

means for executing instructions on said processor to automatically generate code that when executed automatically maps said information between said object-oriented application and said structured database;

executing instructions on said processor to generate code for each object class, including code for four routines associated with said object class, said four routines being:
  a routine to create an instance of said object class;
  a routine to retrieve an instance of said object class;
  a routine to update an instance of said object class; and
  a routine to delete an instance of said object class, each of said four routines based on said semantic elements of said object model; and
means associated with said first processor for outputting said code to persistent storage.

30. The method of claim 6 wherein said step of executing instructions on said processor to load into temporary storage for processing a database schema further includes executing instructions on said processor to load into temporary storage for processing a database schema that describes tables organized in rows and columns, each one of said tables further containing a foreign key column that represents a mapping between a row in said table and a row in another table of said structured database.

* * * * *